(12) United States Patent
Yamawaki

(10) Patent No.: US 6,449,554 B2
(45) Date of Patent: Sep. 10, 2002

(54) TRAVEL SPEED CONTROLLER FOR ELECTRICALLY POWERED LIGHT WEIGHT VEHICLE, AND ELECTRICALLY POWERED LIGHT WEIGHT VEHICLE

(75) Inventor: Hajime Yamawaki, Hamamatsu (JP)

(73) Assignees: Yasuyuki Suzuki, Hamamatsu (JP); Moriyasu Suzuki, Hamamatsu (JP)

( * ) Notice: Subject to any disclaimer, the term of this patent is extended or adjusted under 35 U.S.C. 154(b) by 0 days.

(21) Appl. No.: 09/764,447

(22) Filed: Jan. 19, 2001

(30) Foreign Application Priority Data

Jan. 25, 2000 (JP) .......................................... 2000-015817

(51) Int. Cl.⁷ ................................................ G06F 7/00
(52) U.S. Cl. ............................ 701/93; 701/70; 701/79; 701/83; 477/154; 477/186; 477/187
(58) Field of Search ............................... 701/70, 81, 91, 701/93, 79, 83; 477/110, 120, 154, 186, 187, 900, 182

(56) References Cited

U.S. PATENT DOCUMENTS 5,505,277 A * 4/1996 Suganuma et al. ......... 180/206
5,777,451 A * 7/1998 Kobayashi et al. ......... 318/587
6,236,929 B1 * 5/2001 Sen et al. ..................... 701/93

* cited by examiner

Primary Examiner—Gertrude Arthur
(74) Attorney, Agent, or Firm—Oliff & Berridge PLC

(57) ABSTRACT

A travel speed controller for use in an electrically powered light weight vehicle with a battery-powered motor and a control circuit. If an operator applies some accelerating force or a physical force, to the vehicle body, the control circuit receives a plus signal from a rotation transmission means attached to its wheel, corresponding to the accelerating force, and calculates an acceleration based on operation treatment of variation of time intervals of the pulse signal, memorizes the acceleration, and supplies to the motor a driving electric current corresponding to the memorized acceleration. If a higher acceleration is calculated, the memorized acceleration is renewed and a driving electric current is supplied to the motor, corresponding to the renewed acceleration.

3 Claims, 5 Drawing Sheets

Fig. 5
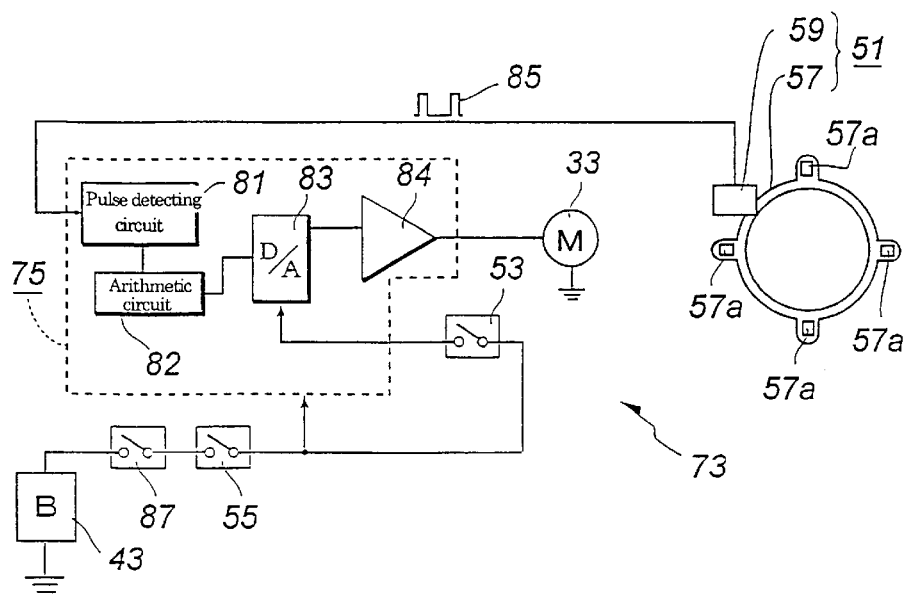
Fig. 6A
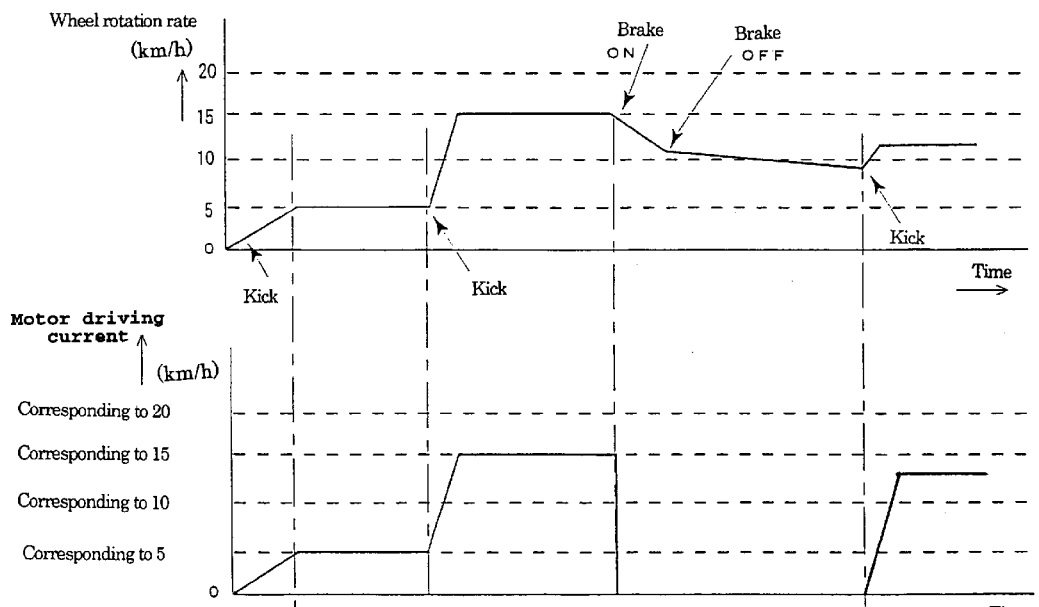
Fig. 6B

TRAVEL SPEED CONTROLLER FOR ELECTRICALLY POWERED LIGHT WEIGHT VEHICLE, AND ELECTRICALLY POWERED LIGHT WEIGHT VEHICLE

BACKGROUND OF THE INVENTION

1. Field of the Invention

This invention relates to a travel speed controller for use in an electrically powered light weight vehicle, and to an electrically powered light weight vehicle. More particularly, this invention relates to a travel speed controller which can control the travel speed of an electrically powered light weight vehicle of the type in which battery-powered motor is used as a prime motor, such as an electrically powered bicycle or an electrically powered wheelchair, and the electrically powered light weight vehicle provided with the controller. The travel speed controller can control the travel speed of the electrically powered light weight vehicle, with no aid of an accelerator nor foot pedals, automatically in such a manner as to substantially reflect an operator's physical strength or will.

2. Description of the Related Art

There are recently various types of electrically powered light weight vehicles of the type above. Among them, there has been provided a bicycle body of an ordinary type, with a battery and a motor being mounted thereon. Since the fundamental operation of this type of vehicle requires no complicated skill or special knowledge, this type of vehicle has now gained public favor among various generations from children to elder people. Further, since environmental problem, or air pollution is being caused due to exhaust gas from vehicles, the number of user seems to be increasing year by year.

The travel speed of this popular type of vehicle is usually controlled by operating an accelerator device (variable resistor, etc.) or pumping of foot pedals.

In many vehicles of the type, a handle bar grip is used also as an accelerator dial. In these cases, an operator may mistakenly rotate the accelerator dial whereby the vehicle would become out of control, eventually causing serious traffic accident. Such mistake is provided particularly by not-experienced operators. Even though the operators could become more careful, since the human being cannot become perfect, such a wrong operation cannot be exterminated.

As for the case of vehicle in which the pedals also serve as the accelerator, the rotation rate of the motor is controlled based on the result obtained by detecting the rotation rate of pedals. Correspondingly, when reducing the travel speed, the operator is required, not only to apply the brakes to the vehicle, but also to surely stop the rotation of the pedals. Considering the discussion above, controlling the travel speed by such operations as explained above would not been easy against operator's expectations. Further, during deceleration, unless the main power switch is turned OFF, the motor is still driven corresponding to the travel speed at that time. Correspondingly, the battery power is being consumed at a high rate, and therefore the travel range would be limited.

SUMMARY OF THE INVENTION

In the light of problems which have been described as above, an object of the present invention is to provide a travel speed controller for use in an electrically powered light weight vehicle, which, if the controller is provided with the vehicle, can control the travel speed of the vehicle, with no aid of an accelerator nor foot pedals, automatically in such a manner as to substantially reflect an operator's physical strength or will. Eventually, the vehicle can surely reduces wrong operation, thus reducing traffic accident.

Another object of the present invention is to provide a travel speed controller for use in an electrically powered light weight vehicle, which, if the controller is provided with the vehicle, can surely stop drive of the motor during decceleration, thus saving electric power of battery.

Further, a further object of the present invention is to provide a safe and comfortable electrically powered light weight vehicle provided with the travel speed controller as above discussed.

To achieve the above objects, corresponding to the invention, there is provided, a travel speed controller for use in an electrically powered light weight vehicle comprising: a human riding part, a brake means, a battery-powered motor, a rotation transmission means for transmitting rotation of said motor to a wheel via a free gear, a wheel rotation sensor for outputting a pulse signal in proportion to the rotation rate of said wheel, a brake switch for outputting a signal corresponding to operation of said brake means, and a control circuit for calculating an acceleration based on operation treatment of variation of time intervals of the pulse signal outputted from said wheel rotation sensor and memorizing the acceleration, and supplying to said motor a driving electric current corresponding to the memorized acceleration, said control circuit being adjusted to calculate an acceleration based on operation treatment of variation of time intervals of the pulse signal being outputted from said wheel rotation sensor and, if the calculated acceleration exceeds the memorized acceleration, to renew the memorized acceleration, and being adjusted, if a signal is inputted from said brake switch, to erase the memorized acceleration.

Corresponding to the invention, there is further provided an electrically powered light weight vehicle comprising: a body frame for supporting a plurality of wheels and being provided with a human riding part and a steering means, a motor, a battery for use as a source of electric power to said motor, a rotation transmission means for transmitting rotation of said motor to a wheel via a free gear, a brake means for applying the brakes to rotation of said wheels, and a travel speed controller, said travel speed controller having: a wheel rotation sensor for outputting a pulse signal in proportion to the rotation rate of said wheel, a brake switch for outputting a signal corresponding to operation of said brake means, and a control circuit for calculating an acceleration based on operation treatment of variation of time intervals of the pulse signal outputted from said wheel rotation sensor and memorizing the acceleration, and supplying to said motor a driving electric current corresponding to the memorized acceleration, said control circuit being adjusted to calculate an acceleration based on operation treatment of variation of time intervals of the pulse signal being outputted from said wheel rotation sensor and, if the calculated acceleration exceeds the memorized acceleration, to renew the memorized acceleration, and being adjusted, if a signal is inputted from said brake switch, to erase the memorized acceleration.

With this structure, according to the electrically powered light weight vehicle provided with the travel speed controller as above discussed, an operator pushes ahead of the body of the vehicle, or, upon sitting on a saddle, kicks the ground, similarly when riding on an ordinary bicycle. These actions apply an accelerating force of an intended amount to the vehicle body. Thereby, the motor of the vehicle is actuated at a rotation rate corresponding to the accelerating force. After actuation, the motor is controllably driven at a rotation rate as to have the wheel to be kept at the maximum rotation rate obtained when the accelerating force was being applied.

Then, during travelling, when a further accelerating force is applied to the vehicle body by applying physical power of the operator, for example by kicking the ground, and by traveling along the downhill road, the rotation rate of the motor, or the driving power, is changed corresponding to the further accelerating force to have the wheel to be rotated at the maximum rotation rate obtained when the further accelerating force was being applied.

When the operator applies the brakes during travelling, since supply of the driving power is cut off from the motor, the rotation of the motor is stopped. That is, the travel speed is controlled only by strength of the brakes applied by the operator. During the time, the vehicle is being moved only by inertia. Thereafter, only when any accelerating force is applied again, for example by kicking the ground, the motor is re-actuated and re-driven so as to have the wheel to be rotated. Since the brake is necessarily applied when intentionally stopping the vehicle 1, the motor is stopped and keeps the state unless any accelerating force is applied.

As above discussed, according to the present invention, the human power is required only when actuating and accelerating the vehicle, and these occasions are limited and temporary. In other words, the travel of the vehicle depends on the rotative power of the motor. However, the travel speed is controlled based solely on an operator's will and physical strength. In particular, when the operator applies the brakes, the reduction rate of the travel speed depends only on the strength of the brakes applied by the operator, and the vehicle is then being moved by inertia. Accordingly, the operator may control the travel speed in the same feeling as that when he controls the travel speed of an ordinary, pedal-motive bicycle. There have been occurred serious traffic accidents of the ordinary electricallypowered light weight vehicle due to unintentional and inappropriate high-speed, such as a sudden movement out of control due to wrong operation of the accelerator device. According to the present invention, however, since there is no acceleration device which must be controlled by the operator himself, the traffic accident due to wrong operation of the accelerator device as above discussed may prevented almost perfectly, and at the same time, since during traveling, the vehicle is moved by driving force of the motor, the operator feels less fatigued than when riding such as a prior-art vehicle described above.

According to the present invention, even during travelling, no driving electric current is supplied to the motor for the period between when the brake is applied and the next accelerating force is applied. Accordingly, the electric power of the battery can be saved, thus the travel range may remarkably be extended.

According to the present invention, since the rotation of the motor is transmitted to the wheel via a free gear (one-way clutch), when the rotative member on the side of the motor as to the free gear, for example a sprocket, is rotated in the rearward direction relative to the wheel, the motor will not make a load against that wheel.

Therefore, when the main power switch of the travel speed controller has been turned OFF, or when the battery has run out, the operator can easily move the vehicle ahead, because the motor makes no load against of the ahead movement. That is, the operator can easily push the vehicle in the same feeling as that of the ordinary foot-pedal type bicycle.

According to the present invention, there is provided a travel speed controller for an electrically powered light weight vehicle as claimed in claim 1, further comprising a circuit with a safety switch in which a contact is closed if a load exceeding a predetermined weight is applied to said human riding part, or in which a contact is opened or closed by operation with hand or foot of an operator, said circuit being adjusted to stop of supply of a driving electric current to said motor under conditions where said contact of said switch is not closed.

With this structure, when an operator unintentionally pushes ahead of the vehicle before he places his body in appropriate position, since no driving electric current is supplied toward the motor, the movement out of control or the falling down of the vehicle may be surely prevented.

The safety switch according to the present invention includes a load switch of which contact is closed and opened by using a pressure-sensitive rubber as an actuator, and any other type of switch of which contact is closed and opened by the operator's hand-or foot-operation (manual operation switch). When the load switch is used as the safety switch, the load switch may be placed on the saddle or the footstep. When the hand-operating switch is used, the switch may be placed on the grip of the handle bar or in the vicinity thereof. When the foot-operating switch is used, the switch may be placed on the foot step, the kickstand, or in the vicinity thereof.

Although there may be provided only one safety switch, there also may be provided combination of two or more safety switches incorporated in a safety switch circuit. The safety switch circuit maybe connected, in series, between the battery and the main power switch.

BRIEF DESCRIPTION OF THE DRAWINGS

The invention will be described below in detail with reference to the accompanying drawings, in which:

FIG. 5 is a block diagram of a travel speed controller which is provided in the electrically powered bicycle as shown in FIG. 1; and FIGS. 6A and 6B are a pair of graphic charts showing a relation between acceleration/deceleration operation and motor driving while the electrically powered bicycle as shown in FIG. 1 is driven.

DETAILED DESCRIPTION OF THE INVENTION

Figure 1:
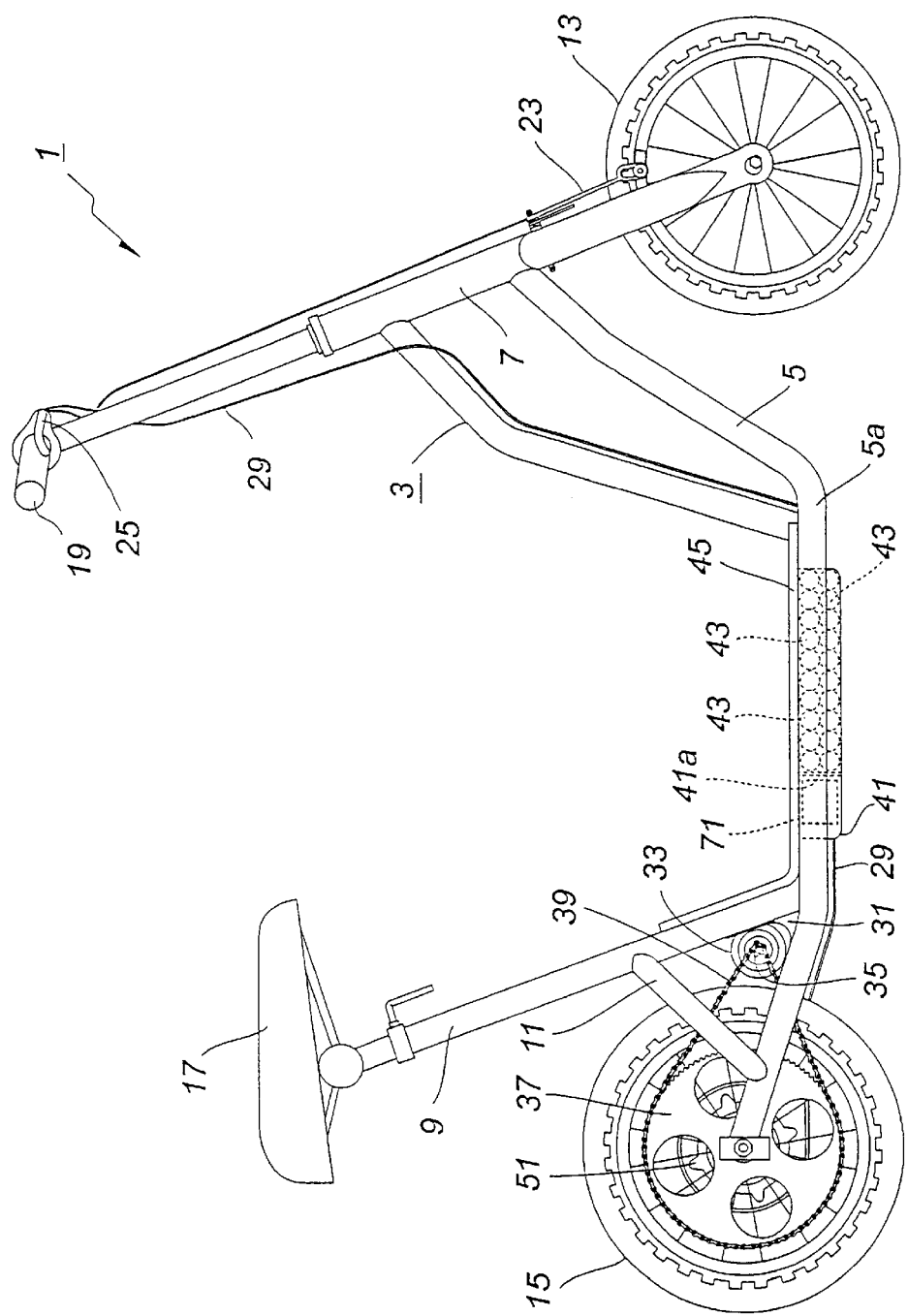
FIG. 1 is an overall side view of an electrically powered bicycle corresponding to an embodiment of the present invention.
Figure 2:
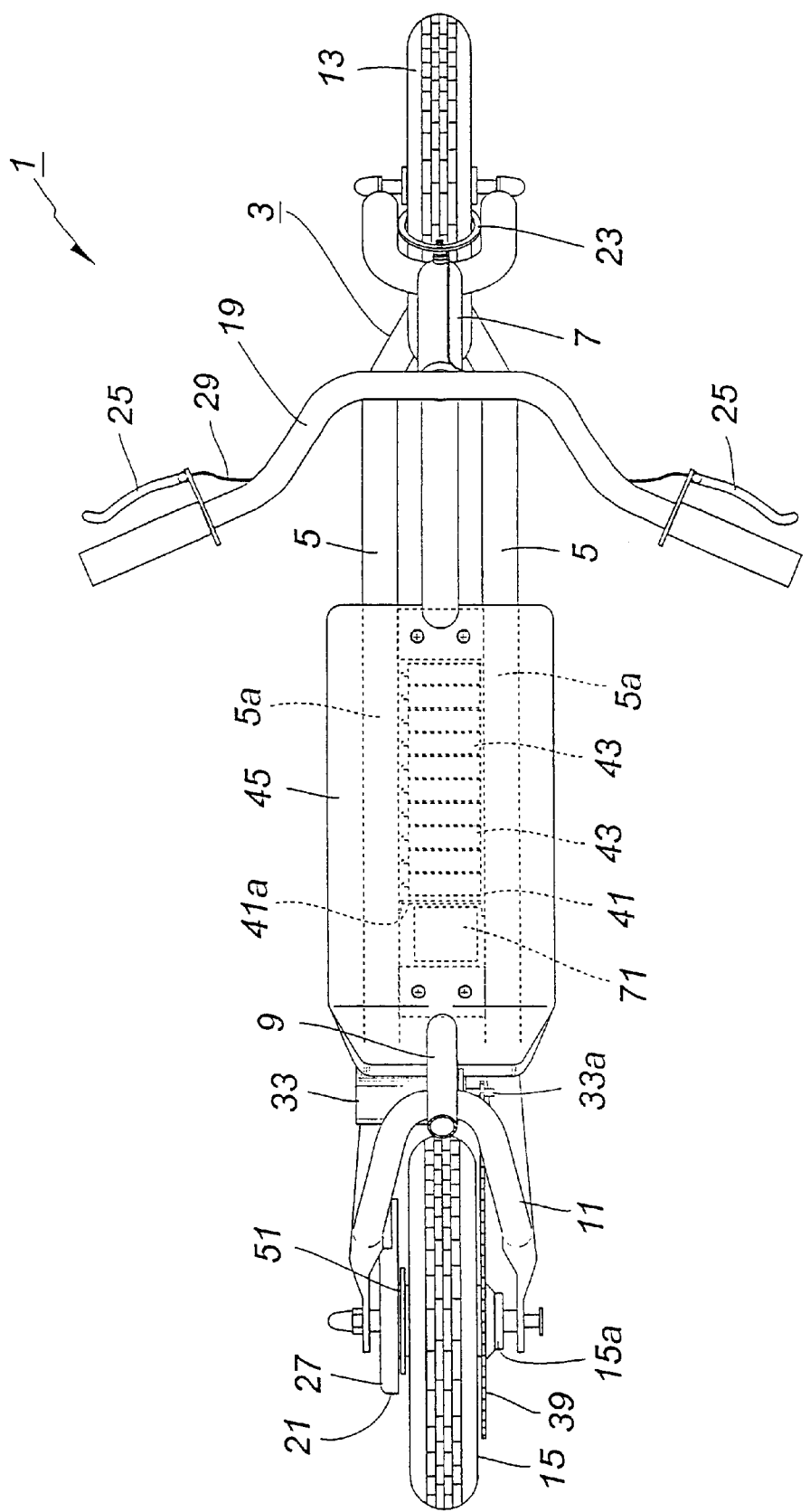
FIG. 2 is a plan view of the electrically powered bicycle as shown in FIG. 1.
Figure 3:
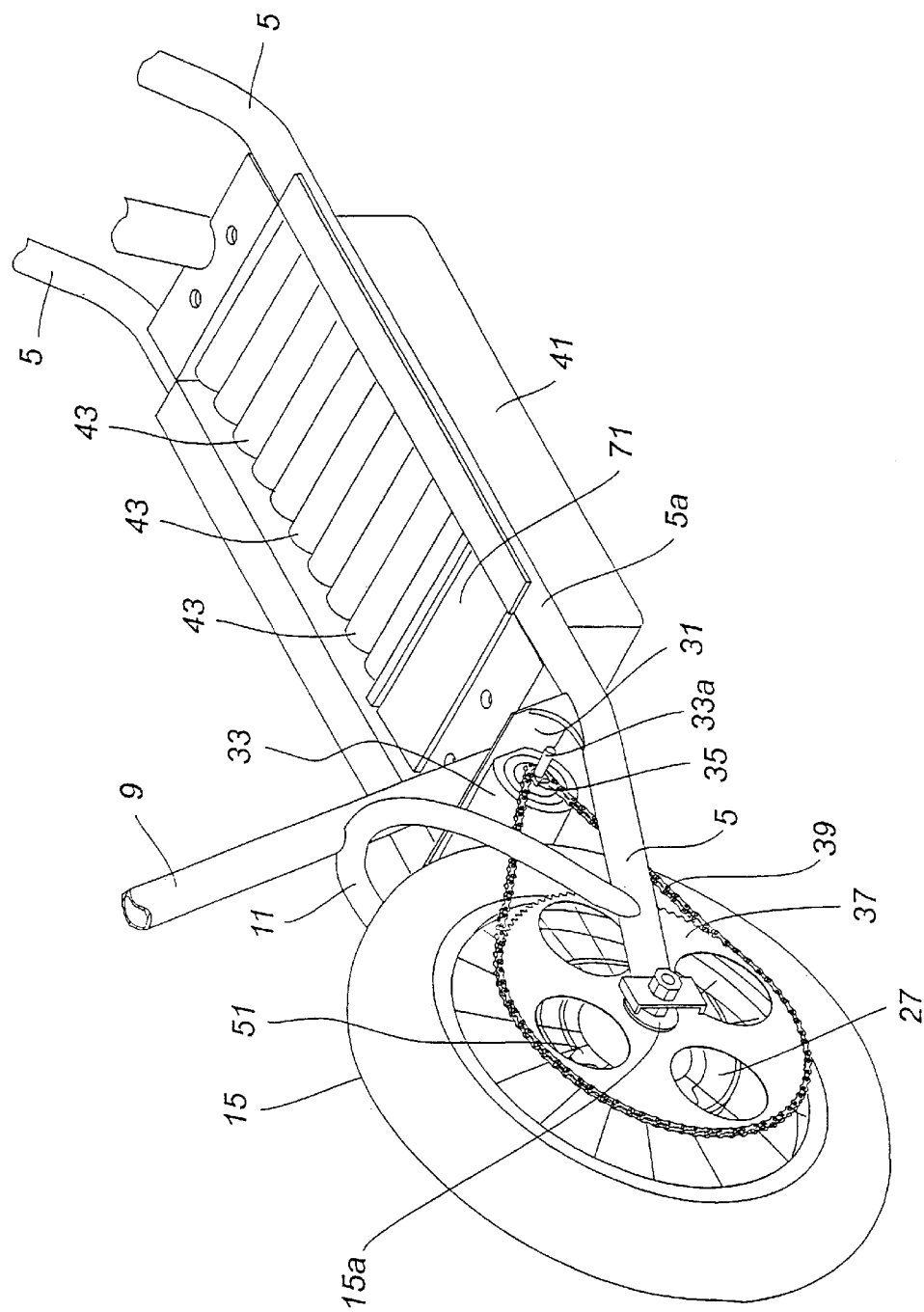
FIG. 3 is an expanded perspective view showing an essential part of the electrically powered bicycle as shown in FIG. 1.

An embodiment of the present invention will now be described in detail. Corresponding to the present embodiment, the explanation will be done with reference to the drawings showing an electrically powered bicycle 1 and a travel speed controller 73.

[A. Body Frame, Brake and Wheels] (FIGS. 1 through 4)

Reference numeral 3 illustrates a body frame of the electrically powered bicycle 1. The body frame 3 comprises a pair of main frames 5 elongating substantially parallel to each other, a front frame 7 which supports a front wheel 13 at the lower end thereof, a saddle frame 9 arising from the rear end of a horizontal bottom part 5a of the main frames 5, and a reinforcing frame 11 connecting the saddle frame 9 and the rear part of the main frames 5. A rear wheel 15 is supported at the rear end of the main frames 5, and a saddle 17 is mounted on the top of the saddle frame 9.

A handle bar 19 is mounted on the top of the front frame 7. The handle bar 19 is provided with a pair of grips at the left and right ends thereof respectively. The grips face to a pair of brake levers 25, respectively. The brake levers 25 are provided respectively for a rear brake 21 and a front brake 23.

The rear brake 21 and the front brake 23 are both wire-operable type. A conventional type of band brake is used as the rear brake 21. The rear brake 21 has a brake shoe housing 27, and an end of a band-fastening arm 28 is partially protruding from the brake shoe housing 27 and is connected to an end of a brake wire 29.

[B. Motor, Battery and Foot Step] (FIGS. 1 through 4)

At a rear corner space formed by the main frames 5 and the saddle frame 9, there is provided a motor mounting plate 31 fixed on the main frames 5 and the saddle frame 9. There is attached a relatively small-sized DC motor 33 to the motor mounting plate 31. The DC motor 33 is of an armature voltage control type, and has an output shaft 33a to which a sprocket wheel 35 of a small diameter is attached. There is attached a sprocket wheel 37 of a larger diameter to a right end part of a hub 15a of the rear wheel 15, and these sprocket wheels 37 and 35 are mechanically engaged with each other by means of an endless chain 39 connecting each sprocket wheel 35 and 37. The sprocket wheel 37 and the hub 15a are connected to each other via an unillustrated free gear (one-way clutch). When the sprocket wheel 37 is rotated in a forward direction, the rotative power of the motor 33 is transmitted to the rear wheel 15.

There is mounted a battery case 41 on the bottom part 5a of the main frames 5. The battery case 41 is a top-opened, rectangular parallelepiped shape, elongating from the front to the rear of the main frames 5. There are flanges horizontally protruding from the edges of the opening of the battery case 41 placed on the bottom part 5a. Accordingly, the battery case 41 is accommodated in a space formed by the bottom part 5a between the main frames 5. The battery case 41 has a partition 41a provided at the position relatively closer to the rear end thereof, and twenty (20) batteries 43 are accommodated in the battery case 41 at the space in front of the partition 41a. The batteries 43 are of a rechargeable type, each having 1.2 volt (polar voltage). The batteries are placed in two stages in the battery case 41, and all connected in series to provide, in total, an output voltage of 24 volt.

There is provided a foot step 45 on the bottom part 5a of the main frames 5, so that the opening of the battery case 41 may be covered thereby, and the foot step 45, together with the flange 41a of the battery case 41, is screw-fixed on the main frames 5 at the front and rear, opposite ends thereof.

[C. Sensor and Switch] (FIGS. 1 through 5)

This electrically powered bicycle 1 is provided with a wheel rotation sensor 51 which detects the rotation rate of the rear wheel 15, a brake switch 53 which outputs a signal corresponding to the operation of the rear brake 21, and a ride-detecting switch 55 which outputs a signal when the load exceeding a predetermined weight is applied to the foot step 45.

As for the wheel rotation sensor 51 (see FIGS. 2, 4 and 5), a magnetic electromotive type of encoder is used. There is provided a ring shape of rotative plate 57, at a left end part of the hub 15a of the rear wheel 15, coaxially with the hub 15a of the rear wheel 15.

There are four permanent magnets 57a fixed on the outer periphery of the rotative plate 57 at time intervals of the angle of 90°. There is a bracket 58 protruding rearward from the reinforcing frame 11 (see FIG. 4), to which a magnetic electromotive element 59 is attached. The magnetic electromotive element 59 is faced towards the revolution locus of the permanent magnets 57a.

Consequently, when the rear wheel 15 is rotated, the pulse signal is outputted from the magnetic electromotive element 59 at time intervals in proportion to the rotation rate of the rear wheel 15.

Figure 4:
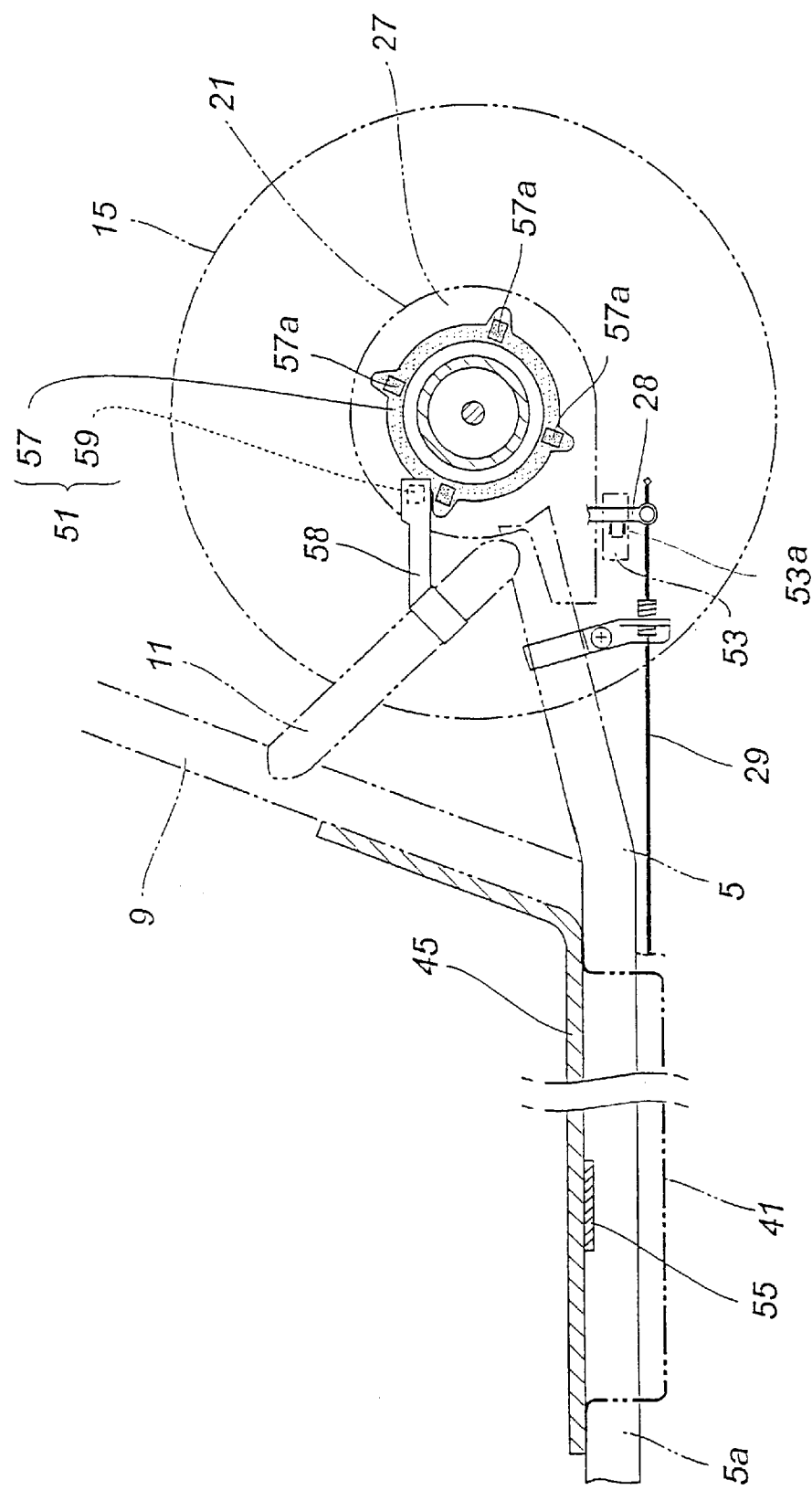
FIG. 4 is a side view of the electrically powered bicycle as shown in FIG. 1, in which an essential part thereof is partially cut and expanded.

A small-sized, "a" contact type of limit switch is used for the brake switch 53 (see FIG. 4). The brake switch 53 is mounted on an unillustrated bracket protruding from the brake shoe housing 27, and a roller 53a mounted on the top of an actuator of the brake switch 53 is positioned partially crossing the swing locus of the band fastening arm 28. Accordingly, each time when the brake lever 25 for the rear brake 21 is held tightly and thus the band fastening arm 28 is rotatively moved in the front direction, the roller 53a is pushed, thus the contact of the switch 53 become closed. On the other hand, when the holding of the brake lever 25 is released, the contact of the switch 53 become opened.

As for the ride-detecting switch 55 (see FIG. 4), a pressure sensitive switch of which responsive pressure is about 2–4 kg is used. The ride-detecting switch 55 is provided on the lower (bottom) surface of the foot step 45 so that the contact of the ride-detecting switch 55 may become closed when more than 2–4 kg load is applied to the foot step 45.

Accordingly, if an operator sits on the saddle 17 and places the feet on the foot step 45, or if an operator places one foot on the foot step 45 and kicks the ground by another foot, that is, a load exceeding 2–4 kg is applied to the foot step 45, the contact of the ride-detecting switch 55 will become closed. On the other hand, if the load is removed, this contact will then become opened.

[D. Travel Speed Controller] (FIG. 5)

Now referring back to FIG. 3, there is provided a control box 71 accommodating a control circuit 75 in the space at the rear of the partition 41a of the battery case 41. The travel speed controller 73 comprises the control circuit 75, the wheel rotation sensor 51 and the brake switch 53.

The positive terminal of the batteries 43 is connected to the control circuit 75 and the brake switch 53. There is positioned a main power switch 87 and the ride-detecting switch 55 connected in series between the batteries 43 and the control circuit 75 or the brake switch 53

Reference numeral 81 in the control circuit 75 illustrates a pulse detecting circuit. A pulse signal 85 outputted from the magnetic electromotive element 59 of the wheel rotation sensor 51 is detected on this pulse detecting circuit 81, and is then outputted to an arithmetic circuit 82.

The arithmetic circuit 82 is for example composed of a combinational logic circuit of an integrator and a differentiator. The arithmetic circuit 82 calculates an acceleration based on variation of time intervals of the pulse signal 85 outputted from the pulse detecting circuit 81. If the calculated acceleration is more than a previously memorized acceleration, an acceleration signal corresponding to the acceleration is outputted to a D/A conversion circuit 83.

The D/A conversion circuit 83 then carries out the analog conversion of the inputted acceleration signal into the voltage signal (command voltage) r and the thus obtained command voltage is then outputted to a motor driver amplifier 84.

The motor driver amplifier 84 then amplifies the command voltage outputted from the D/A conversion circuit 83 in order to supply a corresponding, driving electric current to the motor 33.

The D/A conversion circuit 83 is provided with a memory circuit in order to memorize an acceleration signal obtained on the arithmetic circuit 82. The memory circuit compares a newly inputted acceleration signal with the old (memorized) acceleration signal, and when the newly inputted acceleration signal is larger than the old (memorized) acceleration signal, a new command voltage is outputted to the motor driver amplifier 84, amending the difference in acceleration signal. Further, the acceleration signal is renewed in the memory circuit.

The brake switch 53 is connected to the control signal gate of the D/A conversion circuit 83, and when the signal from this brake switch 53 is inputted in the D/A conversion circuit 83, the memory of the acceleration signal is reset corresponding to the acceleration value of "0", and consequently, the driving electric current supply to the motor 33 is cut off. Therefore, after the acceleration memory is reset, unless the acceleration exceeding "0" is obtained by calculation of the arithmetic circuit 82 due to increase of rotation rate of the rear wheel 15, no driving electric current will be supplied to the motor 33.

The above discussed is the structure of the electrically powered bicycle 1, and the operation method and function will be described as below.

[E. Operation Method and Function]

The operation method and function of the electrically powered bicycle 1 will now be described with reference to graphic charts as illustrated in FIGS. 6A and 6B. FIGS. 6A and 6B illustrate an example of an operation method and the travelling state corresponding thereto. The graphic chart of FIG. 6A shows the travel speed of the vehicle, and the graphic chart of FIG. 6B shows the rotation state of the motor 33.

When an operator starts driving of this electrically powered bicycle 1, the main power switch 87 shall be turned ON, and the operator would start driving of this electrically powered bicycle 1 in the same manner as that of an ordinary bicycle, that is, by holding both grips of the handle bar 19 by the hands of the operator, and by pushing ahead of the whole body of the electrically powered bicycle 1. In practice, the operator may place one foot on the foot step 45 and kick the ground by another foot, or the operator may sit on the saddle 17 and kick the ground, or the operator may push ahead of the whole body of the bicycle 1 while riding on the foot step 45 or the saddle 17. These actions of the operator correspond to the first "kick" as illustrated in FIG. 6A, and according to FIG. 6A, the travel speed reaches the maximum travel speed at 5 km/h by this first kick.

The rear wheel 15 is rotated as long as the whole body of the bicycle 1 is pushed ahead, regardless of the kind of actions discussed above. Further, the weight of the operator is loaded on the footstep 45, thereby the contact of the ride-detecting switch 55 becomes closed. Then, corresponding to the rotation of the rear wheel 15, the wheel rotation sensor 51 outputs the pulse signal 85 to the control circuit 75 at the time intervals corresponding to the rotation rate of the rear wheel 15 at that time. Consequently, the arithmetic circuit 82 calculates the acceleration corresponding to variation of time intervals of the outputted pulse signal 85, and the obtained acceleration signal is then memorized in the D/A conversion circuit 83. A driving electric current corresponding to the thus obtained acceleration signal is supplied to the motor 33 in order to drive the motor 33, thus the wheel 15 is rotated by the motor 33. The rotation rate of the rear wheel 15 reaches and keeps the maximum travel speed at 5 km/h, that is the rate obtained by the accelerating force when the whole body of the bicycle 1 is pushed ahead by the operator.

When an operator drives this electrically powered bicycle 1, without applying the brakes, only on the flat and level road having no slopes the driving power of the motor 33 will not ordinarily be changed. That is, when the road resistance applied to the vehicle from the ground changes, some resistance is ordinarily applied to the wheel 15, and can give no accelerating force to the bicycle 1. Therefore, it is admitted that the time intervals of the pulse signal 85 inputted to the arithmetic circuit 82 may become longer, but such time intervals may never become shorter. In this case, the acceleration signal of the D/A conversion circuit 83 will not be renewed, thus the driving electric current supplied from the motor driver amplifier 84 to the motor 33 can not be changed, and consequently, the bicycle 1 still travels at the constant speed of 5 km/h. The operator may feel that the driving of this electrically powered bicycle 1 at the constant speed of 5 km/h is almost the same feeling as that when he rides and drives an ordinary pedal-motive bicycle by inertia, or when he keeps on pumping of pedals of such an ordinary pedal-motive bicycle at a constant speed.

From this state, when the operator further applies some accelerating force the electrically powered bicycle 1 by kicking the ground again (the second "kick" of the graphic chart in FIG. 6A), the time intervals of the pulse signal 85 becomes shortened, and the acceleration is freshly calculated based on these varied time intervals, and the thus obtained acceleration signal is renewed and memorized as the contents of memory in the D/A conversion circuit 83. Consequently, a driving electric current corresponding to the renewed value of the acceleration signal is supplied to the motor 33, thus the rear wheel 15 is faster rotated by the motor 33. FIG. 6B illustrates the case that, when the operator makes the second kick, the travel speed of the bicycle 1 becomes 15 km/h, and in this case, the bicycle 1 travels by the motor 33 at the constant speed of 15 km/h. This increase of travel speed is indeed the reflection of the physical strength or will of the operator.

When the operator applies the brakes during driving ("Brake ON" in FIG. 6A), a control signal is outputted from the brake switch 53 to the D/A conversion circuit 83, thereby the memorized acceleration signal is erased, thus the driving electric current supply to the motor 33 is cut off as shown in FIG. 6B. Accordingly, regardless of the incline of road, the travel speed will only be decelerated according to the strength of the brakes applied by the operator. This is quite the same feeling as that of applying the brakes on an ordinary pedal-motive bicycle.

From this state, when the brake is released ("Brake OFF" in FIG. 6A), unless the rotation rate of the rear wheel 15 increases under conditions where, for example, the bicycle 1 is on the downhill road at that time, the acceleration obtained on the arithmetic circuit 82 will not output an acceleration exceeding "0", thus the bicycle 1 is moved only by inertia, and the travel speed is decelerated gradually.

After the brake is released and the travel speed begins to be decelerated as above discussed, when the operator applies some accelerating force to the electrically powered bicycle 1 by kicking the ground again (the third "kick" in FIG. 6A), the acceleration exceeding "0" is obtained on the arithmetic circuit 82, and a driving electric current corresponding to the obtained acceleration is supplied to the motor 33, thereby the rear wheel 15 is rotated again by the motor 33 as shown in FIG. 6B.

When travel state ends and the bicycle 1 stops, the motor 33 will not be actuated again, provided that no accelerating force is applied, for example, by pushed ahead.

When the main power switch 87 is turned OFF, or when the operator rides off the foot step 45 although the main power switch 87 has been turned ON, or when the batteries run out, the motor 33 will not be actuated regardless of the rotation of the rear wheel 15. Therefore, even if the operator manually pushes ahead of the vehicle in these conditions and, the bicycle 1 will not start moving automatically. Further, because of existence of the unillustrated free gear, the motor 33 will not make a load, thus the bicycle 1 can easily be moved manually.

If the operator jumps out of the electrically powered bicycle 1 during traveling, the contact of the ride-detecting switch 55 becomes opened, thereby the driving electric current supply to the motor 33 is cut off.

The maximum travel speed can be varied arbitrarily, for example by changing the amplification limit of the motor driver amplifier 84. According to the example of FIGS. 6A and 6B, the maximum travel speed is set to 20 km/h.

As above discussed, according to the travel speed controller for electrically powered light weight vehicle, or the electrically powered light weight vehicle itself, although traveling of the vehicle depends on the rotative power of the electric motor, the travel speed control is determined only by the will and physical strength of the operator himself, so the operator may control the travel speed in the same feeling as that when he controls the travel speed of an ordinary pedal-motive bicycle. In the prior art, there have been serious traffic accidents of the electrically powered light weight vehicle due to unintentional and inappropriate speed, such as a sudden movement out of control due to wrong operation of its accelerator device. According to the present invention, however, since there is no acceleration device which must be controlled by an operator himself, traffic accidents due to wrong operation of the accelerator device as above discussed maybe prevented almost perfectly, and at the same time, since the travel of the vehicle depends on the power of the electric motor, the operator may not be fatigued due to pumping of pedals or too much kicking of the ground.

According to the present invention, during travelling, no driving electric current is supplied to the motor for the period between when the brake is applied and when the next accelerating force (kick) is applied. Accordingly, the electric power of the battery can be saved, thus the travel range can remarkably be extended.

In addition, according to the present invention, since the rotation of the electric motor is transmitted to the wheel via the free gear, when the rotative member is positioned on the side of the electric motor as to the free gear, for example, a sprocket, rotates in the rearward direction relative to the wheel, the electric motor will not make a load against that wheel.

Therefore, when the main power switch of the travel speed. controller has been turned OFF, or when the batteries 43 have run out, the electric motor will not make a load even if the vehicle is moved ahead only by the human power. Thus the vehicle may be pushed ahead, without any difficulty ,only by the operator's human power in the same feeling as that of an ordinary bicycle.

According to claim 2 of the present invention, when an operator unintentionally pushes ahead of the vehicle before he places his body at the appropriate position, since no driving electric current can be supplied to the motor, the movement out of control or the falling down of the vehicle can be prevented perfectly.

The present invention is of course not limited to the embodiment as above discussed, and there may be variations as long as not departing from the spirit and scope of the invention.

For example, although the magnetic type of wheel rotation sensor is used in the present embodiment, there may be a photoelectric or other type used for the wheel rotation sensor.

Further, the brake switch may be placed at a position where the movement of the brake lever may directly or indirectly actuate the brake switch.

The control circuit according to the present invention includes, not only a sequencer, but a microcomputer.

The travel speed controller according to the present invention will not limited to those used for bicycle, and may be utilized as the travel speed controller for various types of electrically powered light weight vehicle provided that a battery powered electric motor is used as a prime mover.

What is claimed is:

1. A travel speed controller for use in an electrically powered light weight vehicle, comprising:
   a seat;
   a brake means;
   a battery-powered motor;
   a rotation transmission means for transmitting rotation of said motor to a wheel via a free gear;
   a wheel rotation sensor for outputting a pulse signal corresponding to a rotation rate of said wheel;
   a brake switch for outputting a signal corresponding to operation of said brake means; and
   a control circuit for calculating an acceleration based on pulse signals outputted from said wheel rotation sensor, memorizing the acceleration, and supplying to said motor a driving electric current corresponding to the memorized acceleration, wherein said control circuit subsequently calculates an acceleration based on subsequent pulse signals outputted from said wheel rotation sensor such that if the calculated subsequent acceleration exceeds the memorized acceleration, then the subsequent acceleration replaces the memorized acceleration, and if a signal is inputted from said brake switch, the memorized acceleration is erased.

2. The travel speed controller for an electrically powered light weight vehicle as claimed in claim 1, further comprising a circuit with a safety switch in which a contact is closed if a load exceeding a predetermined weight is applied to said seat, or in which the contact is opened or closed by an operator, said circuit being adjusted to stop supply of the driving electric current to said motor when said contact of said switch is not closed.

3. An electrically powered light weight vehicle, comprising:
   a body frame for supporting a plurality of wheels and being provided with a seat;
   a steering means;
   a motor;
   a battery for use as a source of electric power to said motor;
   a rotation transmission means for transmitting rotation of said motor to one of the plurality of wheels via a free gear;
   a brake means for applying brakes to stop rotation of said plurality of wheels; and
   a travel speed controller, said travel speed controller having a wheel rotation sensor for outputting a pulse signal corresponding to a rotation rate of said plurality of wheels, a brake switch for outputting a signal corresponding to operation of said brake means, and a control circuit for calculating an acceleration based on a variation of time intervals of the pulse signal outputted from said wheel rotation sensor, memorizing the acceleration, and supplying to said motor a driving electric current corresponding to the memorized acceleration, wherein said control circuit subsequently calculates an acceleration based on subsequent pulse signals outputted from said wheel rotation sensor such that if the subsequent calculated acceleration exceeds the memorized acceleration, the memorized acceleration is replaced with the subsequent acceleration, and if a signal is inputted from said brake switch, the memorized acceleration is erased.

* * * * *